US012610441B2

(12) United States Patent
Shen

(10) Patent No.: US 12,610,441 B2
(45) Date of Patent: Apr. 21, 2026

(54) KNOB-TYPE LIGHT DIMMER DEVICE

(71) Applicant: Chengli Li, Suzhou (CN)

(72) Inventor: Lingwei Shen, Suzhou (CN)

(73) Assignee: Chengli Li, Suzhou (CN)

( * ) Notice: Subject to any disclaimer, the term of this patent is extended or adjusted under 35 U.S.C. 154(b) by 281 days.

(21) Appl. No.: 18/522,084

(22) Filed: Nov. 28, 2023

(65) Prior Publication Data

US 2025/0081309 A1 Mar. 6, 2025

(30) Foreign Application Priority Data

Aug. 29, 2023 (CN) ......................... 202311096049.7

(51) Int. Cl.
*H05B 47/10* (2020.01)
*H01H 19/14* (2006.01)

(52) U.S. Cl.
CPC ............. *H05B 47/10* (2020.01); *H01H 19/14* (2013.01); *H01H 2231/052* (2013.01)

(58) Field of Classification Search
CPC .. H05B 47/10; H01H 19/14; H01H 2231/052; G05G 1/10
See application file for complete search history.

(56) References Cited

U.S. PATENT DOCUMENTS 12,287,664 B2 * 4/2025 Chi .......................... G05G 1/10
2025/0218710 A1 * 7/2025 Chen ...................... H01H 19/14

* cited by examiner

*Primary Examiner* — Lheiren Mae A Caroc
(74) *Attorney, Agent, or Firm* — Chen Yoshimura LLP

(57) ABSTRACT

A knob-type dimmer, including a housing; a circuit board; a switch; a trigger, partially exposed to the outside of the dimmer and moves in response to external forces to trigger or release a switch to control electrical connection or disconnection because the dimmer and a power source; an electrical connection matching component; a first mounting match portion; a knob assembly, including a base, a knob, and an electrical connection component, the base including a first mounting portion which cooperates with the first mounting match portion to mount the knob assembly to the housing, where the electrical connection component cooperates with the electrical connection matching component; a second mounting match portion; a face cover, including a second mounting portion which cooperates with the second mounting match portion to mount the face cover to the housing and to at least partially cover the base.

17 Claims, 4 Drawing Sheets

KNOB-TYPE LIGHT DIMMER DEVICE

BACKGROUND OF THE INVENTION

This invention relates to light illumination control devices, and in particular, it relates to a knob-type light dimmer device.

A dimmer is an electrical device that changes the luminous flux of a light source in a lighting device and adjusts the level of illumination. Its basic principle is to change the effective current that is input to the light source to achieve dimming. In conventional knob-type (rotary) dimmers, the rotary knob is usually a single component, such as a knob cap with a groove in the middle. During assembly, the knob is simply placed on the shaft of the dimmer body. However, with the continuous improvement of the function and structure of the main portion of the dimmer, this traditional knob structure and its assembly method are often no longer suitable for the main portion of the improved dimmer. In addition, traditional knob-type dimmers are typically provided with a trigger mechanism on the outer surface of the device, such as a toggle switch, to trigger the electrical connection or disconnection between the dimmer and the power supply. However, this triggering mechanism leaves a hole on the outer surface of the dimmer that directly connects from the outer surface to the interior of the device, impacting its safety.

SUMMARY OF THE INVENTION

To solve the above problems, embodiments of the present invention provide an improved knob-type light dimmer device.

In one aspect, the present invention provides a knob-type light dimmer device, which includes: a housing; a circuit board disposed in the housing; a switch disposed in the housing and coupled to the circuit board, configured to control electrical connection or disconnection between the circuit board and a power supply; a trigger, partially disposed in the housing and partially exposed through an opening, the trigger being movable in response to an external force, configured to trigger or release the switch to control the electrical connection or disconnection between the circuit board and the power supply; an electrical connection matching component disposed in the housing and coupled to the circuit board; a first mounting match portion disposed in the housing; a knob assembly, which includes a base, a knob disposed on a first side of the base, and an electrical connection component disposed on a second side of the base opposite the first side, wherein the base includes a first mounting portion, wherein when the knob assembly is assembled into the housing, the first mounting portion cooperate with the first mounting match portion to affix the knob assembly to the housing and the electrical connection component cooperates with the electrical connection matching component to form electrical connection between the knob assembly and the circuit board; a second mounting match portion; and a face cover, which includes a second mounting portion, wherein when the face cover is assembled to the housing, the second mounting portion cooperates with the second mounting match portion to affix the face cover to the housing and to at least partially cover the base.

In some embodiments, the opening is formed in the face cover.

In some embodiments, the dimmer further includes a middle cover disposed in the housing, wherein the electrical connection matching component is disposed on the middle cover, and the first mounting match portion is formed on the middle cover.

In some embodiments, the first mounting portion includes a screw connection portion formed on a first part of the base and a snap connection portion formed on a second part of the base, wherein the first mounting match portion includes a screw connection match portion formed on a first part of the middle cover and a snap connection match portion formed on a second part of the middle cover, wherein when the knob assembly is assembled to the housing, the snap connection portion cooperates with the snap connection match portion and the screw connection portion cooperates with the screw connection match portion to affix the knob assembly to the middle cover inside the housing.

In some embodiments, the face cover includes a first sub-cover and a second sub-cover, wherein the first sub-cover at least partially covers the first part of the base, and the second sub-cover at least partially covers the second part of the base.

In some embodiments, the first sub-cover includes a first front panel and two side parts extending from both sides of the first front panel, the second sub-cover includes a second front panel and two side parts extending from both sides of the second front panel, wherein the opening is formed on the second front panel, wherein the two side parts of the first sub-cover and the two side parts of the second sub-cover respectively include inward bending parts to form the second mounting portion, and wherein two side walls of the first part of the base and two side walls of the second part of the base respectively include notches to form the second mounting match portion.

In some embodiments, outer surfaces of the two sides of the first sub-cover and outer surfaces of the two sides of the second sub-cover respectively include concave step portions configured to cooperate with external tools to open the first sub-cover and the second sub-cover.

In some embodiments, the trigger includes a lever and a lever cover covering a first end of the lever, the lever cover being exposed through the opening, wherein a second end of the lever opposite to the first end is coupled to the switch, wherein the lever cover is moveable in response to external force and drives the lever to move, and wherein movement of the second end of the lever triggers or releases the switch.

In some embodiments, the electrical connection component includes a pin, and the electrical connection matching component includes a slot.

In some embodiments, the dimmer further includes a face panel mounted to the housing, the face panel defining an opening, wherein the base of the knob assembly is disposed in the opening of the face panel.

In knob-type dimmer according to various embodiments of the present invention, by installing a face cover on the base of the knob assembly, the snap connection position and screw connection position formed by the connection between the base and the housing can be covered, and the holes left on the outer surface of the dimmer due to the setting of the trigger that pass through to the interior of the dimmer can be covered, thereby improving the safety of the dimmer.

BRIEF DESCRIPTION OF DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols.

DETAILED DESCRIPTION OF THE INVENTION

Figure 1:
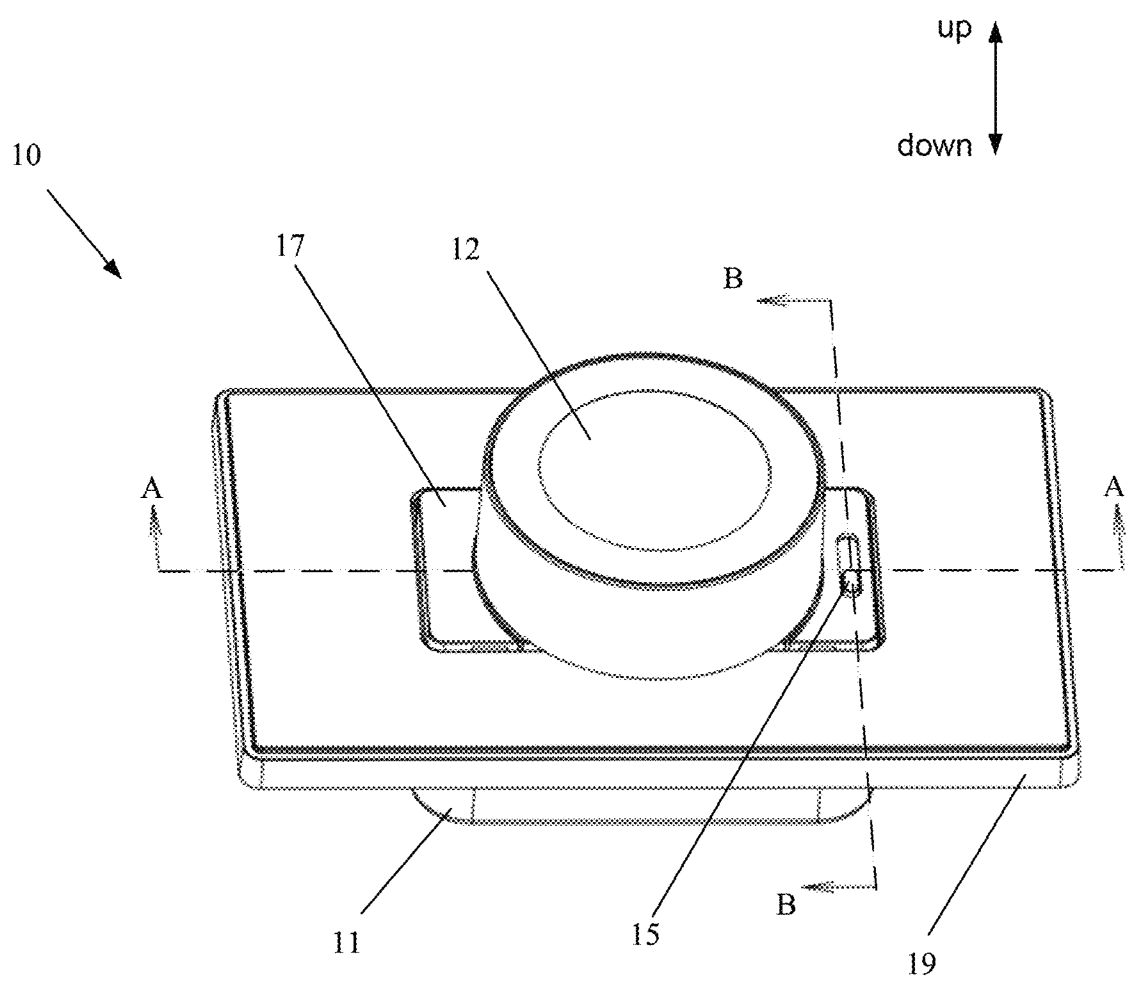
FIG. 1 illustrates a knob-type light dimmer according to an embodiment of the present invention.

Preferred embodiments of the present and their applications are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

In conventional knob-type dimmers, the knob is usually a single component, such as a knob cap with a groove. However, with the continuous improvement of the function and structure of the main portion of the dimmer, this traditional knob structure and its assembly method are often no longer suitable for the main portion of the improved dimmer. In addition, traditional knob-type dimmers are typically provided with a trigger mechanism on the outer surface of the device, such as a toggle switch, to trigger electrical the connection or disconnection between the dimmer and the power supply. However, this triggering mechanism leaves a hole on the outer surface of the dimmer that directly connects from the outer surface to the interior of the device, impacting its safety.

To solve the above problems, embodiments of the present invention provide a knob-type light adjustment device, the structure, characteristics and advantages of which are described below with reference to FIGS. 1-4.

Referring to FIGS. 1 to 4, the knob-type (rotary) dimmer 10 includes a housing 11, a knob assembly 12, a circuit board 13, a switch 14, a trigger 15, an electrical connection matching component 16, and a face cover 17. The housing 11 defines a cavity for accommodating mechanical components and/or electronic components. The knob assembly 12 is assembled to the housing 11. For example, the knob assembly 12 may be assembled to the open side of the cavity of the housing 11, to keep the mechanical components and/or electronic components in the cavity within the housing 11.

The circuit board 13 is disposed in the cavity of the housing 11. The circuit board 13 may have power modules, dimming control modules, or other suitable functional modules connected thereon. These functional modules may be integrated into the entire PCBA (Printed Circuit Board Assembly) or implemented separately on individual PCBAs.

The switch 14 is disposed in the cavity of the housing 11 and coupled to the circuit board 13. The trigger 15 is at least partially disposed in the cavity of the housing 11 and is moveable in response to external forces applied on it, thereby triggering or releasing the trigger of the switch 14. In some embodiments, the switch 14 may include a microswitch (miniature snap-action switch) 142. The microswitch 142 is equipped with spring plate 144. The trigger 15 is moveable in response to the external force applied on it, thereby pressing or releasing the sprint plate 144 to trigger the closing or opening of the microswitch 142. It should be understood that the type of switch 14 is not limited to microswitches, but may also be other types of switches, such as mechanical switches.

The electrical connection matching component 16 is disposed in the cavity of the housing 11 and coupled to the circuit board 13. In some embodiments, the knob-type dimmer 10 may also include a middle cover 112. The electrical connection matching component 16 may be disposed on the middle cover 112. The middle cover 112 is disposed inside the housing 11 and separates the cavity of the housing into two areas. The first area of the cavity is defined by the bottom panel of the housing 11, the lower part of the inner wall of the housing 11, and the first side of the middle cover 112, and contains the circuit board 13, the switch 14, and a portion of the trigger 15. The second area containing the cavity is defined by a second side of the middle cover 112 opposite the first side and an upper part of the inner wall of the housing 11.

The knob assembly 12 includes a base 122, a knob 124, and an electrical connection component (not shown). The base 122 includes a first installation portion 126. The knob 124 is disposed on the first side of the base 122, and the electrical connection component (not shown) is disposed on the second side of the base 122 opposite the first side. The knob assembly 12 also includes a circuit board 123, which may be located in the knob 124 and/or the base 122. The knob may be manually operated (rotated), and components on the circuit board 123 generate various electrical signals in response to operation of the knob. When the knob assembly 12 is assembled to the open side of the cavity of the housing 11, the electrical connection component (not shown) located on the second side of the base 122 engage with the electrical connection matching component 16 on the middle cover 112 to form an electrical connection between the circuit board 123 in the knob assembly 12 and the circuit board 13 in the housing 11, thereby enabling various functions such as dimming control.

In addition, when the knob assembly 12 is assembled to the open side of the cavity of the housing 11, the first mounting portion 126 on the base 122 cooperates with a first mounting match portion 114 inside the housing 11 to secure the knob assembly 12 to the housing 11. In some embodiments, the first mounting match portion 114 may be disposed on the middle cover 112. When installing the knob assembly 12, the base 122 is placed in the second area of the cavity formed by the middle cover 112, and the first mounting portion 126 on the base 122 cooperates with the first mounting match portion 114 on the middle cover 112 to mount the knob assembly 12 to the housing 11. It should be noted that the moving parts related to the knob and its operation are all located in the knob assembly, instead of elsewhere in the housing. The coupling between the knob assembly and the housing only involves the electrical connection between the circuit boards 123 and 13, with no moving mechanical connection.

The face cover 17 includes a second mounting portion 173 and an opening 174. When the face cover 17 is assembled to the housing 11, the second mounting portion 173 on the face cover 17 cooperates with the second mounting match portion 125 to mount the face cover 17 to the housing 11 and at least partially cover the base 122. Meanwhile, the trigger 15 is partially exposed to the outside of the dimmer 10 through the opening 174 on the face cover 17, for allowing external force to be applied to it. In some embodiments, the second mounting match portion 125 may be disposed on the base 122 of the knob assembly 12.

Figure 2:
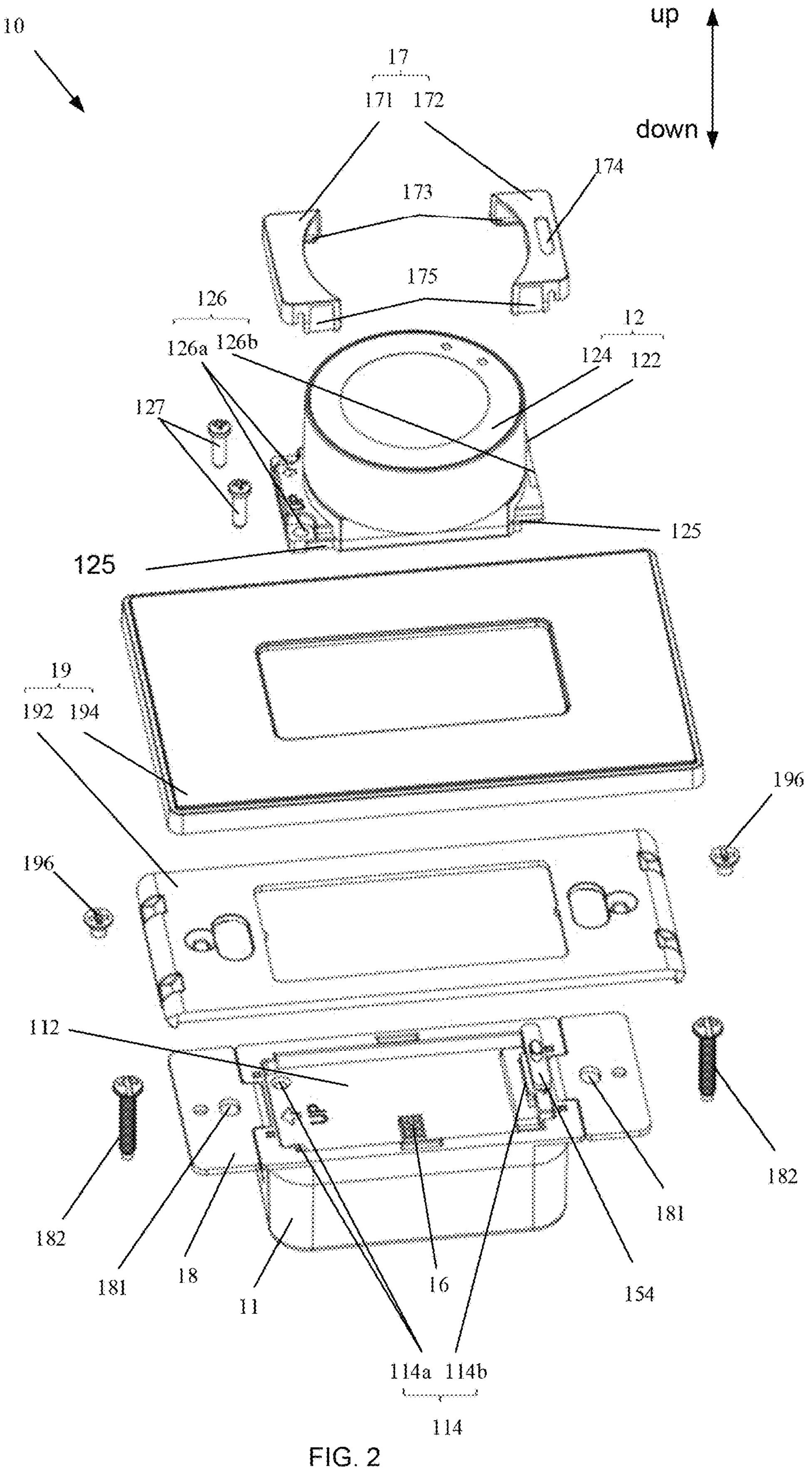
FIG. 2 is an exploded view of a knob-type light dimmer according to an embodiment of the present invention.
Figure 3:
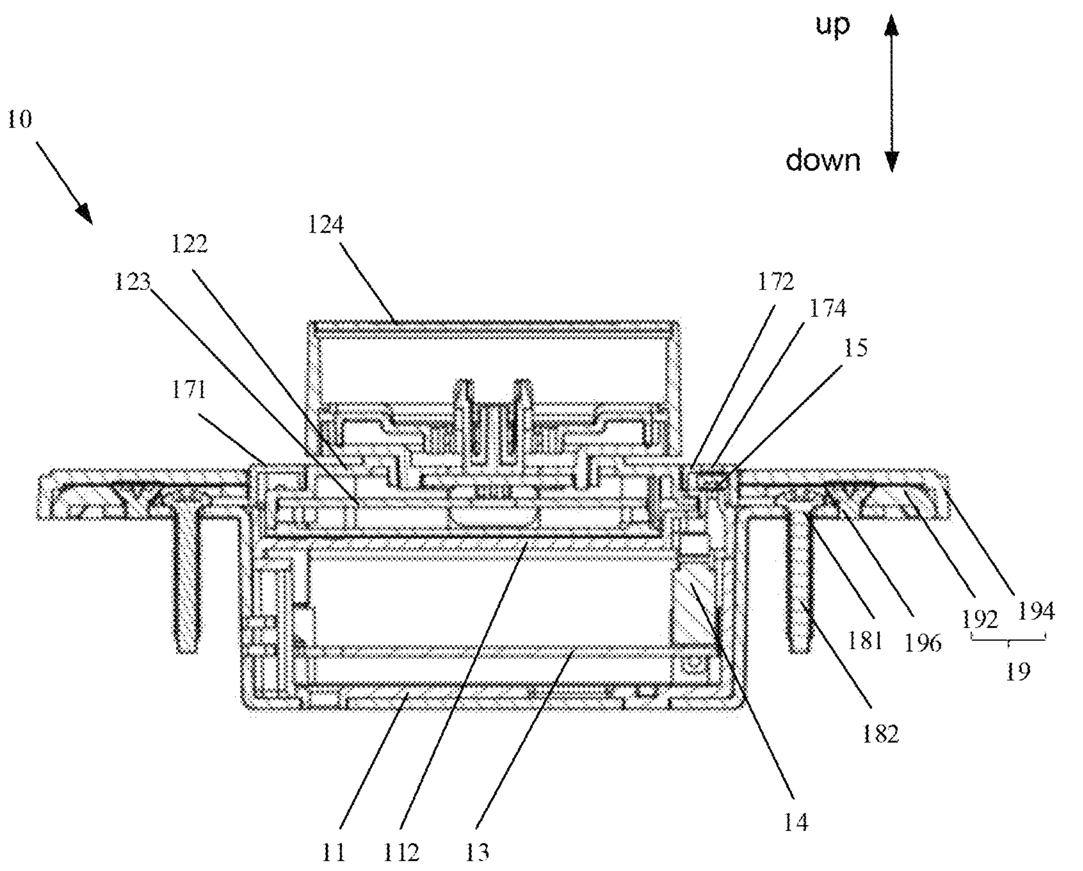
FIG. 3 is a cross-sectional view of the knob-type light dimmer of FIG. 1 along the direction A-A.

When installing and using the knob-type dimmer 10, the housing 11 may be installed in the desired position, such as inside the wall box on the wall. The housing 11 may be affixed to the desired position using screws or other suitable means. In some embodiments, a mounting bracket 18 may be provided on the housing 11. The mounting bracket 18 may be affixed to the housing 11 by clamping or other suitable means. The housing 11 may be installed in the desired position via the mounting bracket 18. For example, multiple screw holes 181 may be provided on the mounting bracket 18 (for example, two screw holes are shown in FIG. 2), and multiple screws 182 (for example, two screws are shown in FIG. 2) pass through these multiple screw holes 181 to affix the housing 11 in the desired position. Then, the knob assembly 12 is installed onto the housing 11, and an electrical connection is formed between the circuit board 123 inside the knob assembly 12 and the circuit board 13 inside the housing 11. Finally, the face cover 17 is installed onto the housing 11 and at least partially covers the base 122 of the knob assembly 12, such that the trigger 15 is partially exposed to the outside of the dimmer 10 through the opening 174 of the face cover 17.

In some embodiments, to protect and/or decorate the dimmer, the dimmer 10 may include a face panel 19, which is mounted to the housing 11. Face panel 19 may include, for example, inner panel 192 and outer panel 194. Openings are formed on the inner panel 192 and the outer panel 194, respectively. During installation and use, the housing 11 is first installed to the desired position via the mounting bracket 18; the inner panel 192 is then mounted onto the mounting bracket 18; the outer panel 194 is then mounted onto the inner plate 192. Next, the base 122 of the knob assembly 12 is placed in the openings of the inner panel 192 and the outer panel 194, and the knob assembly 12 is mounted to the housing 11 by the cooperation between the first mounting portion 126 and the first mounting match portion 114. Finally, the face cover 17 is installed. The inner panel 192 may be affixed to the mounting bracket 18 by, for example, screws 196. The outer panel 194 may be affixed to the inner panel 192 by a snap connection, for example.

After installation, the knob-type dimmer 10 is connected to the power supply and the lighting load, respectively. The illumination level of the lighting load may be adjusted by turning the knob assembly 12.

The power supply end is coupled to the power supply source to obtain electrical energy. The voltage of the power supply source can be, for example, 220V AC voltage in China, 120V AC voltage in North America, or other voltage values in other countries or regions. In some cases, it is necessary to directly cut off the dimmer 10 from the power supply source. To achieve this, the electrical connection or disconnection between the dimmer 10 and the power supply source may be controlled by triggering the switch 14. For example, the trigger 15 may move in response to an external force applied to it, thereby triggering the switch 14 to control the dimmer 10 to be connected to the power supply source, or releasing the trigger of the switch 14 to control the dimmer 10 to be disconnected from the power supply source.

Figure 4:
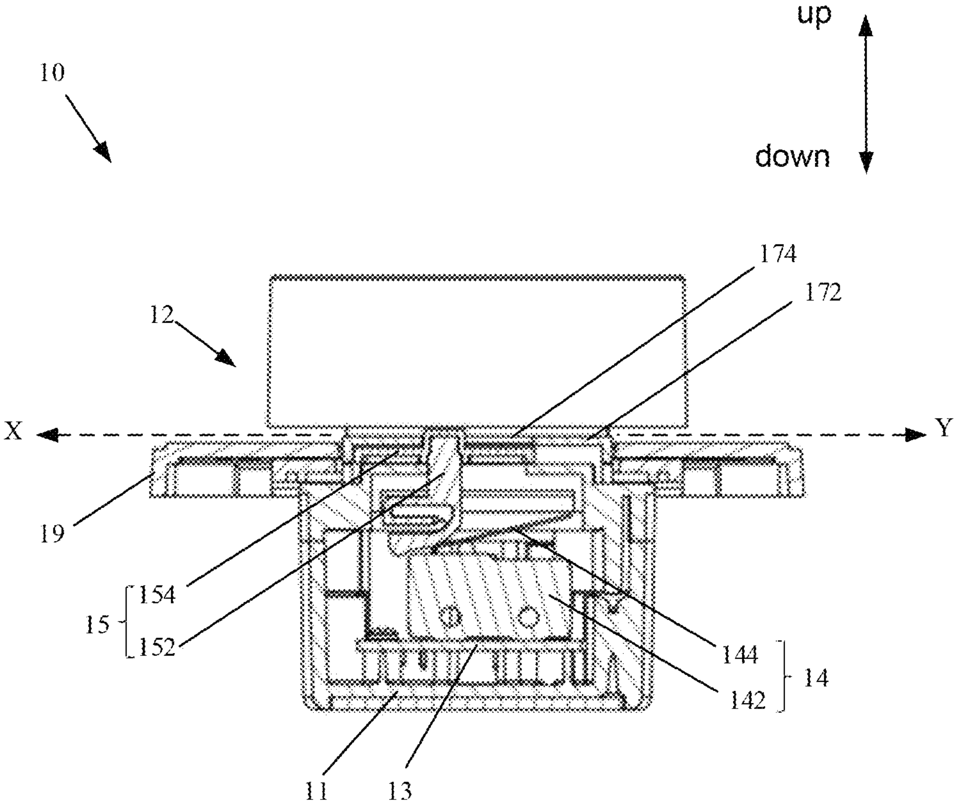
FIG. 4 is a cross-sectional view of the knob-type light adjustment device of FIG. 1 along the direction B-B.

In some embodiments, the trigger 15 may include a lever 152 and a lever cover 154. The cover 154 covers the first end of the lever 152, and the second end of the lever 154 opposite the first end is coupled to the switch 14. The lever outer 154 is exposed to the outside of the knob-type dimmer 10 through an opening 174 on the face cover 17. The lever cover 154 is moveable in response to the external force applied on it, for example, moving towards the X direction or towards the Y direction as shown in FIG. 4, thereby driving the lever 152 to move. In response to the movement of the lever 152, the second end of the lever 152 can trigger or release the switch 14. For example, in response to the movement of the lever 152 towards the Y direction, the second end of the lever 152 presses the spring plate 144 on the microswitch 142 to trigger the microswitch 142 to close, thereby controlling the dimmer 10 to be connected to the power supply source. In response to the movement of the lever 152 towards the X direction, the second end of the lever 152 moves away from the spring plate 144, so the sprint plate 144 returns to its original position, which opens the microswitch 142, thereby controlling the disconnection of the dimmer 10 from the power supply source.

In some embodiments, the electrical connection component (not shown) on the second side of the base 122 may be a pin. Correspondingly, the electrical connection matching component 16 on the middle cover 112 may be a slot, as shown in FIG. 2. When the knob assembly 12 is assembled to the open side of the cavity of the housing 11, the pin is inserted into the slot, thereby forming an electrical connection between the circuit board 123 in the knob assembly 12 and the circuit board 13 in the housing 11.

In some embodiments, the first mounting portion 126 may include a screw connection portion 126*a* and a snap connection portion 126*b*. The screw connection portion 126*a* is formed on the first part of the base 122, and the snap connection portion 126*b* is formed on the second part of the base 122. Correspondingly, the first mounting match portion 114 includes a screw connection match portion 114*a* and a snap connection match portion 114*b*. The screw connection match portion 114*a* may be formed on the first part of the middle cover 112, and the snap connection match portion 114*b* may be formed on the second part of the middle cover 112. The screw connection portion 126*a* and the screw connection match portion 114*a* may each be, for example, two screw holes. The snap connection portion 126*b* may be a snap hook, and the snap connection match portion 114*b* may be a snap slot. When installing the knob assembly 12, the snap hook located on the second part of the base 122 is snapped into the snap slot located on the second part of the middle cover 112, and then the base 122 is fully placed into the second area formed by the middle cover 112, aligning the two screw holes on the first part of the base 122 with the two screw holes on the first part of the middle cover 112. Finally, the base 122 is mounted onto the middle cover 112 using two screws 127, to affix the knob assembly 12 to the housing 11.

In some embodiments, the face cover 17 may include a first sub-cover 171 and a second sub-cover 172. The first sub-cover 171 is assembled onto the first part of the base 122 to at least partially cover the first part of the base 122. The second sub-cover 172 is assembled onto the second part of the base 122 to at least partially cover the second part of the base 122.

In some embodiments, the first sub-cover 171 may include a front panel and two side parts extending from both sides of the front panel. Similarly, the second sub-cover 172 may include a front panel and two side parts extending from both sides of the from panel. The opening 174 may be formed on the front panel of the second sub-cover. The two side parts of the first sub-cover 171 and the two side parts of the second sub-cover 172 respectively include inward bending parts. These inward bending parts form the second mounting portion 173. Correspondingly, the two sidewalls of the first part and the two sidewalls of the second part of the base 122 of the knob assembly 12 each have a notch. These notches form the second mounting match portion 125. When installing the first sub-cover 171 and the second sub-cover 172, they are respectively pressed onto the first and second parts of the base 122. The inward bending parts on the two sides of the first sub-cover 171 and the two sides of the second sub-cover 172 snap into the notches of the two side walls of the first part and the two side walls of the second part of the base 122, thereby affixing the first sub-cover 171 and the second sub-cover 172 on the base 122. Meanwhile, the lever cover 154 of the trigger 15 is exposed to the outside of the dimmer 10 through the opening 174 on the second sub-cover 172 for receiving external force.

In some embodiments, the outer surfaces of the two sides of the first sub-cover 171 and the two sides of the second sub-cover 172 have concave step portions 175, respectively. These concave step portions 175 can cooperate with external tools to open the first sub-cover 171 and the second sub-cover 172.

When disassembling the knob-type dimmer 10, external tools (such as a flat screwdriver) may be used to insert into the concave step portion 175 on the outer surface of the two sides of the first sub-cover 171 and the two sides of the second sub-cover 172, and pry them off the base 122. Then, the two screws 127 may be removed from the screw holes, so that the knob assembly 12 is be removed from housing 11.

After removing the knob assembly 12 from the housing 11, if further disassembly is required, the outer panel 194, the inner panel 192, and the housing 11 may be removed sequentially, until the entire knob-type dimmer 10 is removed from its installation position.

Although the opening 174 is located on the second sub-cover 172 as an example in the drawings and embodiments, it should be understood that in practical applications, the opening 174 may also be located at other suitable positions such as the face panel 19 or the side of the housing 11.

The knob-type dimmer of various embodiments of the present invention can be used in various occasions where the illumination level needs to be adjusted, such as residential buildings, office buildings, shopping centers, or other places.

It should be understood that the embodiments shown in FIGS. 1 to 4 only illustrate and label the main units or components of the knob-type dimmer according to the embodiments of the present invention, and the shapes and arrangement of each unit or component are only for illustration and not limitation. Without departing from the spirit and scope of the present invention, other shapes and sizes of each unit or component may be used in the dimmer.

It will be apparent to those skilled in the art that various modification and variations can be made in the embodiments of the present invention without departing from the spirit or scope of the invention. Thus, it is intended that the present invention cover modifications and variations that come within the scope of the appended claims and their equivalents.

The invention claimed is:

1. A light dimmer device, comprising:

a housing;

a circuit board disposed in the housing;

a switch disposed in the housing and coupled to the circuit board, configured to control electrical connection or disconnection between the circuit board and a power supply;

a trigger, partially disposed in the housing and partially exposed through an opening, the trigger being movable in response to an external force, configured to trigger or release the switch to control the electrical connection or disconnection between the circuit board and the power supply;

an electrical connection matching component disposed in the housing and coupled to the circuit board;

a first mounting match portion disposed in the housing;

a knob assembly, which includes a base, a knob disposed on a first side of the base, and an electrical connection component disposed on a second side of the base opposite the first side, wherein the base includes a first mounting portion, wherein when the knob assembly is assembled into the housing, the first mounting portion cooperates with the first mounting match portion to affix the knob assembly to the housing and the electrical connection component cooperates with the electrical connection matching component to form electrical connection between the knob assembly and the circuit board;

a second mounting match portion; and a face cover, which includes a second mounting portion, wherein when the face cover is assembled to the housing, the second mounting portion cooperates with the second mounting match portion to affix the face cover to the housing and to at least partially cover the base.

2. The light dimmer device of claim 1, wherein the opening is formed in the face cover.

3. The light dimmer device of claim 2, further comprising a middle cover disposed in the housing, wherein the electrical connection matching component is disposed on the middle cover, and the first mounting match portion is formed on the middle cover.

4. The light dimmer device of claim 3, wherein the first mounting portion includes a screw connection portion formed on a first part of the base and a snap connection portion formed on a second part of the base, wherein the first mounting match portion includes a screw connection match portion formed on a first part of the middle cover and a snap connection match portion formed on a second part of the middle cover, wherein when the knob assembly is assembled to the housing, the snap connection portion cooperates with the snap connection match portion and the screw connection portion cooperates with the screw connection match portion to affix the knob assembly to the middle cover inside the housing.

5. The light dimmer device of claim 4, wherein the face cover includes a first sub-cover and a second sub-cover, wherein the first sub-cover at least partially covers the first part of the base, and the second sub-cover at least partially covers the second part of the base.

6. The light dimmer device of claim 5, wherein the first sub-cover includes a first front panel and two side parts extending from both sides of the front panel, the second sub-cover includes a second front panel and two side parts extending from both sides of the second front panel, wherein the opening is formed on the second front panel, wherein the two side parts of the first sub-cover and the two side parts of the second sub-cover respectively include inward bending parts to form the second mounting portion, and two side walls of the first part of the base and two side walls of the second part of the base respectively include notches to form the second mounting match portion.

7. The light dimmer device of claim 6, wherein outer surfaces of the two sides of the first sub-cover and outer surfaces of the two sides of the second sub-cover respectively include concave step portions configured to cooperate with external tools to open the first sub-cover and the second sub-cover.

8. The light dimmer device of claim 1, wherein the trigger includes a lever and a lever cover covering a first end of the lever, the lever cover being exposed through the opening, wherein a second end of the lever opposite to the first end is coupled to the switch, wherein the lever cover is moveable in response to external force and drives the lever to move, and wherein movement of the second end of the lever triggers or releases the switch.

9. The light dimmer device of claim 1, wherein the electrical connection component includes a pin, and the electrical connection matching component includes a slot.

10. The light dimmer device of claim 1, further comprising a face panel mounted to the housing, the face panel defining an opening, wherein the base of the knob assembly is disposed in the opening of the face panel.

11. A light dimmer device, comprising:

a housing;

a first circuit board disposed inside the housing;

a switch disposed inside the housing and coupled to the first circuit board, configured to control electrical connection or disconnection between the first circuit board and a power supply;

a knob assembly, which includes a base, a knob disposed on a first side of the base, and a second circuit board disposed in the knob or the base, wherein the base is affixed to the housing over the first circuit board and the switch, and wherein the first circuit board and the second circuit board are electrically coupled to each other;

a face cover, affixed to the housing and at least partially covering the base of the knob assembly, wherein the face cover defines an opening; and a trigger, partially disposed in the housing and partially exposed through the opening of the face cover, the trigger being movable in response to an external force and configured to trigger or release the switch to control electrical connection or disconnection between the first and second circuit boards and a power supply.

12. The light dimmer device of claim 11, further comprising a middle cover disposed in the housing, wherein the electrical connection matching component is disposed on the middle cover, and the base of the knob assembly is affixed to the middle cover.

13. The light dimmer device of claim 11, wherein the face cover includes a first sub-cover and a second sub-cover, wherein the first sub-cover at least partially covers a first part of the base, and the second sub-cover at least partially covers a second part of the base.

14. The light dimmer device of claim 11, wherein the trigger includes a lever and a lever cover covering a first end of the lever, the lever cover being exposed through the opening of the face cover, wherein a second end of the lever opposite to the first end is coupled to the switch, wherein the lever cover is moveable in response to external force and drives the lever to move, and wherein movement of the second end of the lever triggers or releases the switch.

15. The light dimmer device of claim 11, further comprising an electrical connection matching component disposed in the housing and coupled to the first circuit board, wherein the knob assembly further includes an electrical connection component disposed on a second side of the base opposite the first side, wherein the electrical connection component cooperates with the electrical connection matching component to form an electrical connection between the first circuit board and the second circuit board.

16. The light dimmer device of claim 15, wherein the electrical connection component includes a pin, and the electrical connection matching component includes a slot.

17. The light dimmer device of claim 11, further comprising a face panel mounted to the housing, the face panel defining an opening, wherein the base of the knob assembly is disposed in the opening of the face panel.

* * * * *